(12) United States Patent
Shibata

(10) Patent No.: US 11,168,576 B2
(45) Date of Patent: Nov. 9, 2021

(54) AXIAL FLOW TURBINE

(71) Applicant: Mitsubishi Power, Ltd., Yokohama (JP)

(72) Inventor: Takanori Shibata, Tokyo (JP)

(73) Assignee: Mitsubishi Power, Ltd., Yokohama (JP)

( * ) Notice: Subject to any disclaimer, the term of this patent is extended or adjusted under 35 U.S.C. 154(b) by 48 days.

(21) Appl. No.: 16/719,063

(22) Filed: Dec. 18, 2019

(65) Prior Publication Data

US 2020/0271007 A1  Aug. 27, 2020

(30) Foreign Application Priority Data

Feb. 27, 2019  (JP) .............................. JP2019-034052

(51) Int. Cl.
    *F01D 11/08* (2006.01)
    *F01D 5/22* (2006.01)
    (Continued)

(52) U.S. Cl.
    CPC .............. *F01D 11/08* (2013.01); *F01D 5/225* (2013.01); *F01D 11/02* (2013.01); *F02C 7/28* (2013.01);
    (Continued)

(58) Field of Classification Search
    CPC . F01D 5/225; F01D 5/20; F01D 11/08; F01D 11/02; F05D 2240/55; F05D 2220/31; F02C 7/28; F16J 15/4472
    See application file for complete search history.

(56) References Cited

U.S. PATENT DOCUMENTS

| | | | | |
|---|---|---|---|---|
| 5,088,889 A | * | 2/1992 | Wolff | ...................... F01D 11/02 277/423 |
| 7,971,882 B1 | * | 7/2011 | Liang | ..................... F16J 15/444 277/418 |

(Continued)

FOREIGN PATENT DOCUMENTS

| | | |
|---|---|---|
| JP | 2011-12631 A | 1/2011 |
| JP | 2012-2234 A | 1/2012 |
| JP | 2012-137006 A | 7/2012 |

OTHER PUBLICATIONS

Hindi-language Office Action issued in Indian Application No. 201914052096 dated Jan. 18, 2021 with English translation (5 pages).

*Primary Examiner* — Christopher Verdier
*Assistant Examiner* — Eric A Lange
(74) *Attorney, Agent, or Firm* — Crowell & Moring LLP

(57) ABSTRACT

To provide an axial flow turbine that can eliminate a circumferential velocity component of a leakage flow effectively, and attempt to collect motive power. A shroud of the axial flow turbine includes: an annular first protruding portion protruding toward the upstream side in a rotor's axis direction; an annular second protruding portion that is positioned on the outer side in the rotor's radius direction relative to the first protruding portion, protrudes toward the upstream side in the rotor's axis direction, and is longer than the first protruding portion; a circulating-flow generating chamber formed between the first protruding portion and the second protruding portion; and guide plates positioned in the circulating-flow generating chamber. The circulating-flow generating chamber is configured to generate a circulating flow such that part of leakage flow is allowed to collide with the tip surface of the first protruding portion to be directed to the outer side in the rotor's radius direction, and thereafter collide with the inner circumferential surface of the second (Continued)

protruding portion to be directed to the inner side in the rotor's radius direction. The guide plates are inclined opposite the rotor's rotation direction relative to the inward direction in the rotor's radius direction.

3 Claims, 7 Drawing Sheets

(51) Int. Cl.
     *F01D 11/02*     (2006.01)
     *F02C 7/28*      (2006.01)
     *F16J 15/447*    (2006.01)

(52) U.S. Cl.
     CPC ...... *F05D 2220/31* (2013.01); *F05D 2240/55* (2013.01); *F16J 15/4472* (2013.01)

(56) References Cited

U.S. PATENT DOCUMENTS

| | | | |
|---|---|---|---|
| 2008/0118350 A1* | 5/2008 | Feeny | F01D 11/08 415/173.1 |
| 2013/0129493 A1 | 5/2013 | Matsumoto et al. | |
| 2014/0314579 A1* | 10/2014 | Kuwamura | F01D 11/001 416/223 R |

\* cited by examiner

AXIAL FLOW TURBINE

BACKGROUND OF THE INVENTION

1. Field of the Invention

The present invention relates to an axial flow turbine used for a steam turbine, gas turbine or the like at power plants.

2. Description of the Related Art

An axial flow turbine includes, for example, a plurality of stator blades provided between an annular diaphragm outer ring and an annular diaphragm inner ring, a plurality of rotor blades provided on the outer-circumference side of a rotor such that the rotor blades are positioned on the downstream side of the stator blades; and an annular shroud provided on the outer-circumference side of the rotor blades. An annular groove portion that houses the shroud is formed on the inner circumferential surface of the diaphragm outer ring, and a gap flow path, or a bypass flow path, is formed between the groove portion and the shroud. Then, part of a working fluid, specifically, steam, gas, and the like, flows into the gap flow path from the downstream side of the stator blades, i.e., the upstream side of the rotor blades, in the main flow path as a leakage flow, and flows out from the gap flow path to the downstream side of the rotor blades in the main flow path. Accordingly, the energy of the leakage flow is not used as motive power for the rotor, and bypass loss occurs. Typically, in order to reduce the bypass loss, i.e., in order to lower the rate of the leakage flow, a plurality of stages of seal fins are provided in the gap flow path.

The leakage flow having flowed into the gap flow path from the downstream side of the stator blades in the main flow path has a large circumferential velocity component. Accordingly, a plurality of grooves are formed on the upstream-side side surface of the shroud, for example, in JP-2012-137006-A. The plurality of grooves are inclined opposite the rotor's rotation direction relative to the outward direction in the rotor's radius direction, and guide the direction of the leakage flow. Thereby, it is configured to reduce the circumferential velocity component of the leakage flow, and to attempt to collect motive power.

SUMMARY OF THE INVENTION

However, in the conventional technique explained above, there is room for improvement like the following ones. That is, according to the conventional technique described in JP-2012-137006-A, the leakage flow is caused only to pass through the plurality of grooves in order to cause the direction of the leakage flow to turn. Accordingly, unless the number of grooves is increased, it is not possible to sufficiently bring out the effect of causing the direction of the leakage flow to turn, and the effect of eliminating the circumferential velocity component of the leakage flow cannot be attained. Accordingly, it is not possible to attain a sufficient effect of reducing mixing loss caused by the circumferential velocity component of the leakage flow, specifically, loss that is caused when the leakage flow flows out from the gap flow path, and merges with a working fluid having passed through the rotor blades. In addition, it is not possible to attain a sufficient effect of suppressing unstable vibration of the rotating body caused by the circumferential velocity component of the leakage flow.

An object of the present invention is to provide an axial flow turbine that makes it possible to enhance the mixing loss reduction effect and unstable vibration suppression effect, and to attempt to collect motive power.

In order to achieve an object explained above, the present invention provides an axial flow turbine including: a casing; a rotating body; a plurality of stator blades that are provided on an inner-circumference side of the casing and arrayed in a circumference direction; a plurality of rotor blades that are provided on an outer-circumference side of the rotating body and arrayed in the circumference direction; a main flow path in which the plurality of stator blades are arranged and the plurality of rotor blades are arranged on a downstream side of the plurality of stator blades, and through which a working fluid is distributed; a shroud provided on an outer-circumference side of the plurality of rotor blades; an annular groove portion that is formed on the casing and houses the shroud; a gap flow path into which part of the working fluid flows as a leakage flow from a downstream side of the stator blades in the main flow path, and out of which the leakage flow flows to a downstream side of the rotor blades in the main flow path, the gap flow path being formed between the groove portion and the shroud; and a plurality of stages of seal fins provided in the gap flow path. The axial flow turbine further includes: an annular first protruding portion that is formed on the shroud and protrudes toward an upstream side in an axis direction of the rotating body; an annular second protruding portion that is formed on the shroud so as to be positioned on an outer side in a radius direction of the rotating body relative to the first protruding portion, protrudes toward the upstream side in the axis direction of the rotating body, and has a length longer than or equal to the first protruding portion; a circulating-flow generating chamber formed between the first protruding portion and the second protruding portion; and a plurality of guide plates formed on the shroud so as to be positioned in the circulating-flow generating chamber. The circulating-flow generating chamber is configured to generate a circulating flow such that part of the leakage flow is allowed to collide with a tip surface of the first protruding portion to be directed to the outer side in the radius direction of the rotating body and thereafter collide with an inner circumferential surface of the second protruding portion to be directed to an inner side in the radius direction of the rotating body. The plurality of guide plates are inclined opposite a rotation direction of the rotating body relative to an inward direction in the radius direction of the rotating body.

According to the present invention, it is possible to enhance the mixing loss reduction effect and unstable vibration suppression effect and to attempt to collect motive power.

DESCRIPTION OF THE PREFERRED EMBODIMENTS

Hereinafter, embodiments of the present invention in cases when the present invention is applied to a steam turbine are explained with reference to the drawings.

Figure 1:
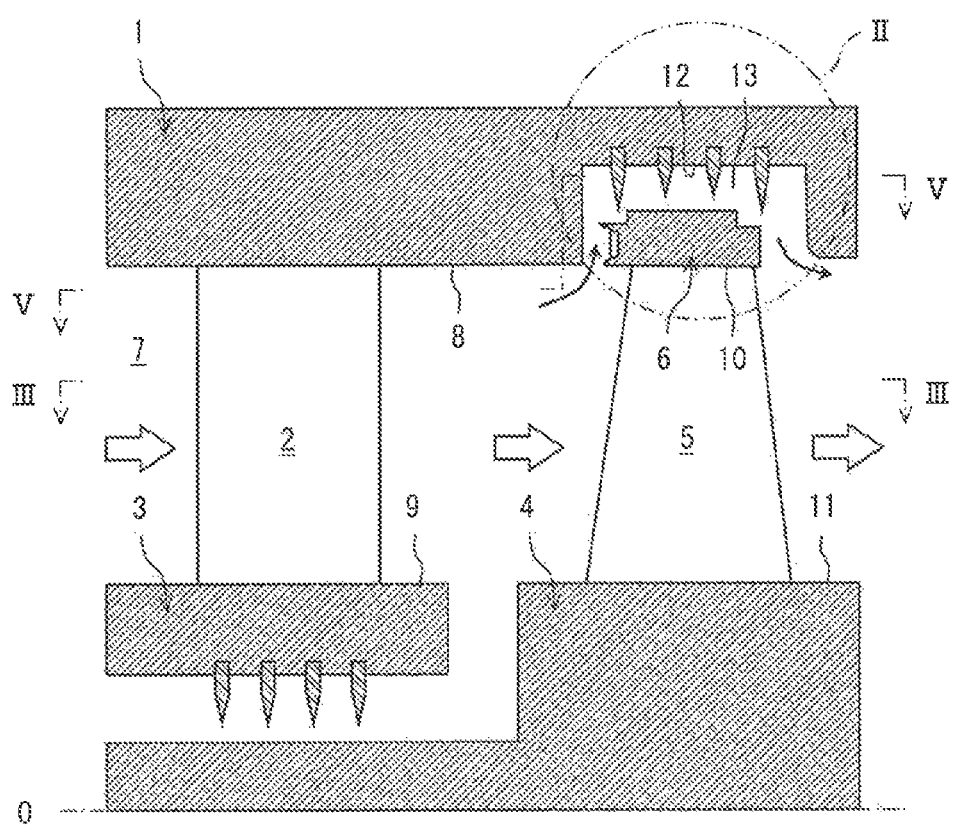
FIG. 1 is a cross-sectional view in a rotor's axis direction schematically representing a partial structure of a steam turbine in a first embodiment of the present invention.
Figure 2:
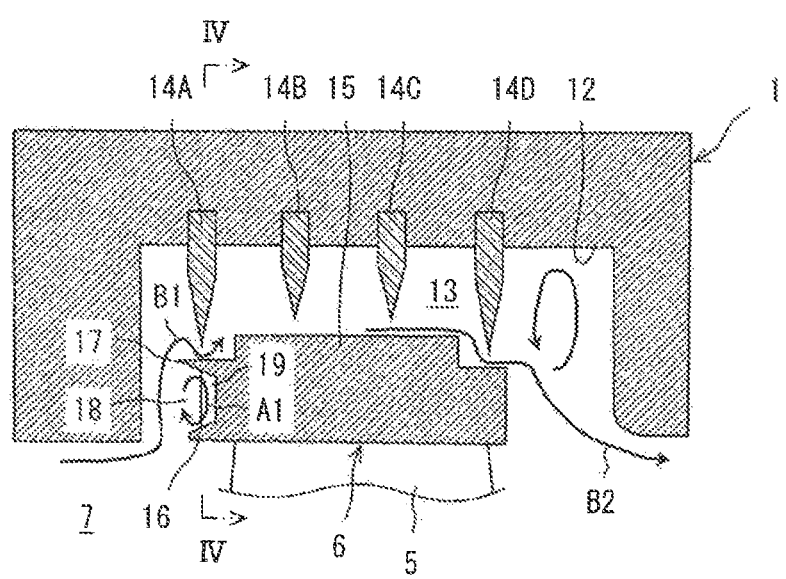
FIG. 2 is a partial enlarged cross-sectional view of a portion II in FIG. 1, and represents a detailed structure of a gap flow path.
Figure 3:
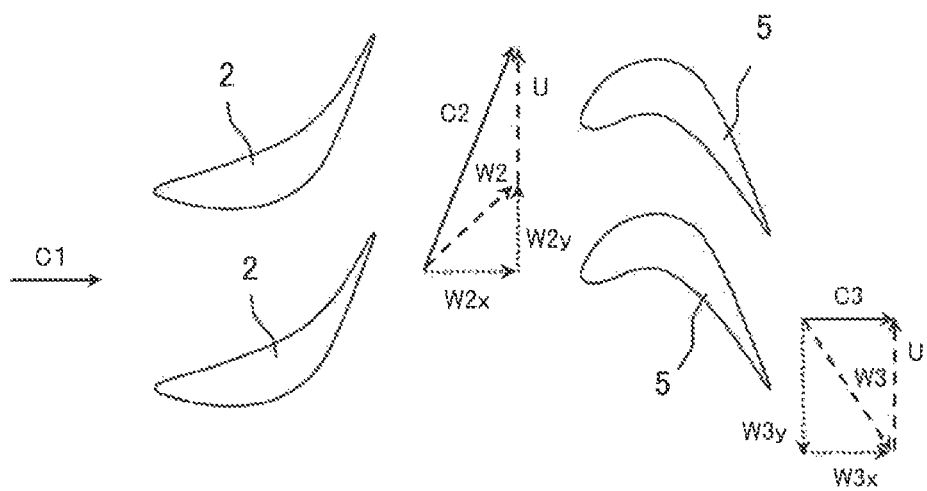
FIG. 3 is a cross-sectional view taken along a cross-section III-III in FIG. 1 in a rotor's circumference direction, and illustrates a flow in a main flow path.
Figure 4:
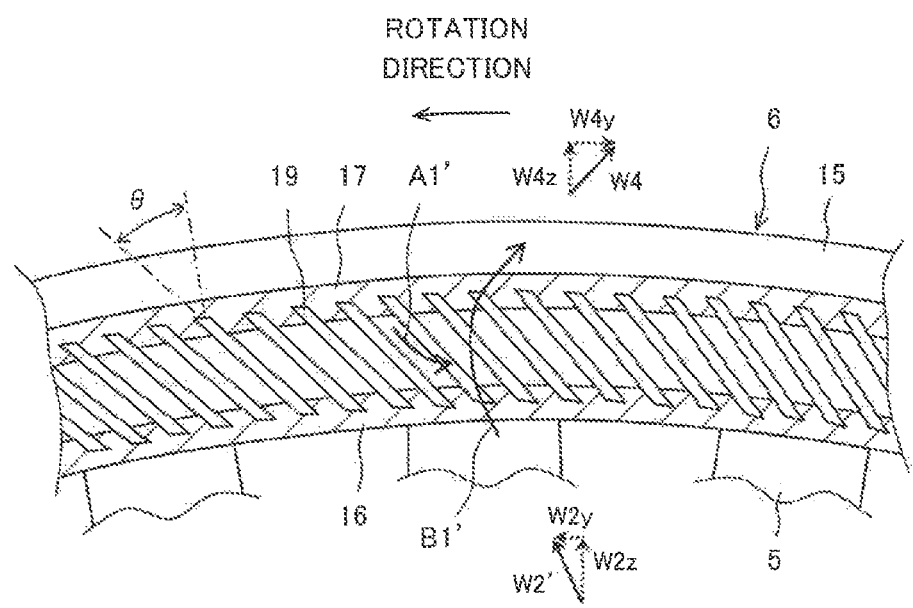
FIG. 4 is a cross-sectional view taken along a cross-section IV-IV in FIG. 2 in a rotor's radius direction, and illustrates a relative flow in the gap flow path.
Figure 5:
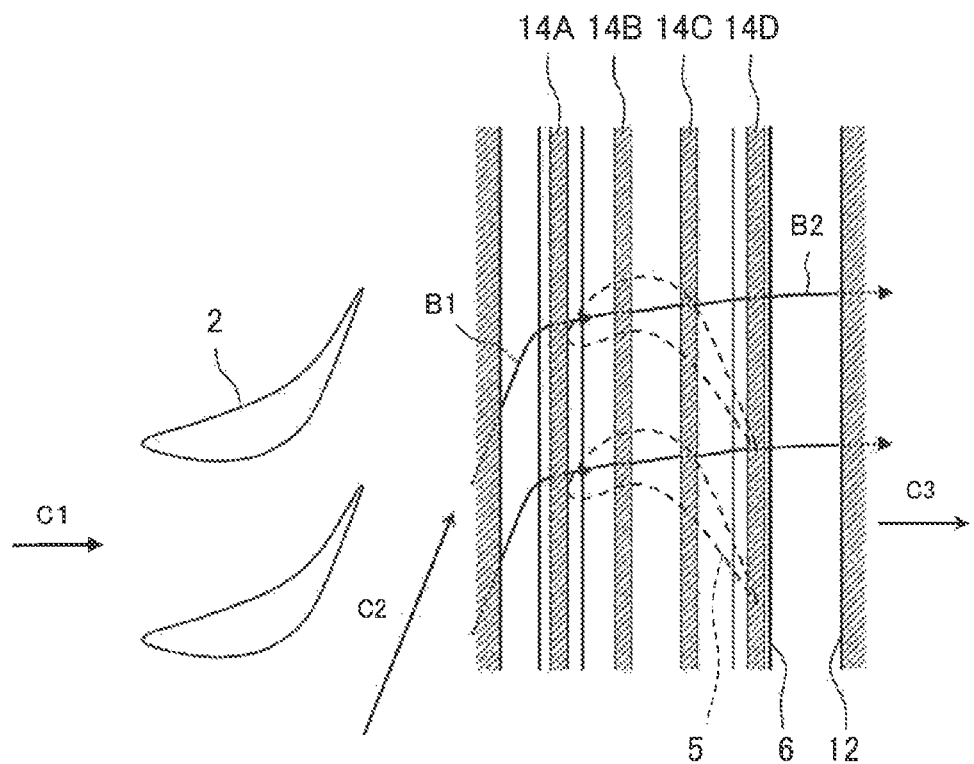
FIG. 5 is a cross-sectional view taken along a cross-section V-V in FIG. 1 in the rotor's circumference direction, and illustrates the flow in the main flow path, and an absolute flow in the gap flow path.

FIG. 1 is a cross-sectional view taken along the rotor's axis direction schematically representing a partial structure, or a stage structure, of a steam turbine in a first embodiment of the present invention. FIG. 2 is a partial enlarged cross-sectional view of the portion II in FIG. 1, and represents the detailed structure of a gap flow path. FIG. 3 is a cross-sectional view taken along the cross-section III-III in FIG. 1 in the rotor's circumference direction, and illustrates a flow in a main flow path. FIG. 4 is a cross-sectional view taken along the cross-section IV-IV in FIG. 2 in the rotor's radius direction, and illustrates a relative flow in the gap flow path, specifically, a flow relative to the rotating-body side. Note that an illustration of the casing side is omitted in FIG. 4 for convenience. FIG. 5 is a cross-sectional view taken along the cross-section V-V in FIG. 1 in the rotor's circumference direction, and illustrates the flow in the main flow path, and an absolute flow in the gap flow path, specifically, a flow relative to the casing side.

The steam turbine in the present embodiment includes: an annular diaphragm outer ring 1, or a stationary body, provided on the inner-circumference side of a casing, not illustrated; a plurality of stator blades 2 provided on the inner-circumference side of the diaphragm outer ring 1; and an annular diaphragm inner ring 3 provided on the inner-circumference side of the stator blades 2. The plurality of stator blades 2 are arrayed between the diaphragm outer ring 1 and the diaphragm inner ring 3 at predetermined intervals in the circumference direction.

In addition, the steam turbine includes: a rotor 4, or a rotating body, that rotates around the rotation axis O; a plurality of rotor blades 5 provided on the outer-circumference side of the rotor 4; and an annular shroud 6 provided on the outer-circumference side of the rotor blades 5, i.e., the blades' tip side. The plurality of rotor blades 5 are arrayed between the rotor 4 and the shroud 6 at predetermined intervals in the circumference direction.

A main flow path 7 for steam, or working fluid, is constituted by a flow path formed between an inner circumferential surface 8 of the diaphragm outer ring 1 and an outer circumferential surface 9 of the diaphragm inner ring 3, a flow path formed between an inner circumferential surface 10 of the shroud 6 and an outer circumferential surface 11 of the rotor 4, and the like. In the main flow path 7, the plurality of stator blades 2, i.e., one stator blade row, are arranged, and the plurality of rotor blades 5, i.e., one rotor blade row, are arranged on the downstream side, or on a right side in the figure, of the plurality of stator blades 2. A combination of these stator blades 2 and rotor blades 5 constitutes one stage. Note that although only one stage is illustrated in FIG. 1 for convenience, a plurality of stages are typically provided in the rotor's axis direction in order to collect the internal energy of steam efficiently.

Steam in the main flow path 7, or main flow steam, flows as illustrated by thick arrows in FIG. 1. Then, the internal energy, i.e., pressure energy and the like, of the steam is converted into kinetic energy, i.e., velocity energy, at the stator blades 2, and the kinetic energy of the steam is converted into the rotational energy of the rotor 4 at the rotor blades 5. In addition, it is configured such that a power generator, not illustrated, is connected at an end portion of the rotor 4, and this power generator converts the rotational energy of the rotor 4 into electrical energy.

A steam flow, or a main flow, in the main flow path 7 is explained with reference to FIG. 3. Steam flows in from the front-edge side of the stator blades 2, or from the left side in FIG. 3, with an absolute velocity vector C1, specifically, an absolute flow with almost no circumferential velocity components. Then, when passing through between the stator blades 2, the steam is accelerated, and caused to turn to have an absolute velocity vector C2, specifically, an absolute flow with a large circumferential velocity component, and flows out from the rear-edge side of the stator blades 2, or from the right side in FIG. 3. Most parts of the steam having flowed out of the stator blades 2 collide with the rotor blades 5 to rotate the rotor 4 at a velocity U. At this time, when passing through the rotor blades 5, the steam is decelerated, and caused to turn, and a relative velocity vector W2 turns a relative velocity vector W3. Accordingly, the steam flowing out of the rotor blades 5 has an absolute velocity vector C3, specifically, an absolute flow with almost no circumferential velocity components.

Note that the relative velocity vector W2 is represented by an axial velocity component W2$x$ and a circumferential velocity component W2$y$, n.b., a velocity component in the rotor's rotation direction. The relative velocity vector W3 is represented by an axial velocity component W3$x$ and a circumferential velocity component W3$y$, n.b., a velocity component opposite to the rotor's rotation direction; W3$y$≈|U|.

Meanwhile, an annular groove portion 12 that houses the shroud 6 is formed on the inner circumferential surface of the diaphragm outer ring 1, and a gap flow path, or a bypass flow path, 13 is formed between the groove portion 12 and the shroud 6. Then, part of steam flows into the gap flow path 13 from the downstream side of the stator blades 2, i.e., the upstream side of the rotor blades 5, in the main flow path 7 as leaked steam, and flows out from the gap flow path 13 to the downstream side of the rotor blades 5 in the main flow path 7, that is so-called "leakage flow." Accordingly, the energy of the leaked steam is not used effectively, and bypass loss occurs. In order to reduce this bypass loss, i.e., in order to lower the flow rate of the leaked steam, a labyrinth seal is provided in the gap flow path 13.

In the labyrinth seal in the present embodiment, annular seal fin 14A to 14D are provided on the inner circumferential surface of the groove portion 12, and the seal fins 14A to 14D are arranged at predetermined intervals in the rotor's axis direction. An annular step portion, or a protruding portion, 15 is formed on the outer-circumference side of the shroud 6 so as to be positioned between the first stage seal fin 14A and the fourth stage seal fin 14D.

Figure 6:
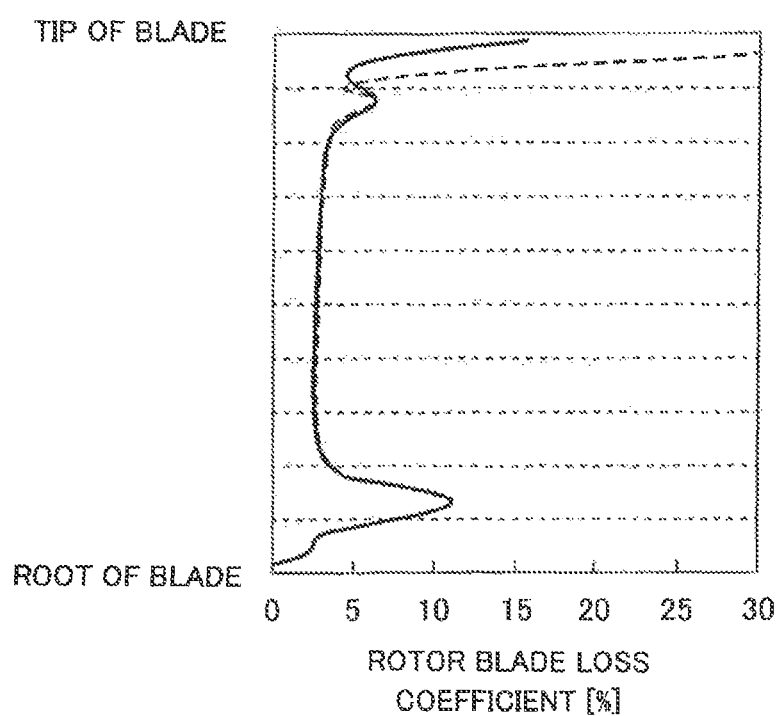
FIG. 6 is a figure representing distributions of rotor blade loss coefficients in the first embodiment of the present invention and a conventional technique.

A main flow steam on the downstream side of the stator blades 2 in the main flow path 7 is an absolute flow with a circumferential velocity component "W2$y$+U" as illustrated in FIG. 3, and a leaked steam having flowed into the gap flow path 13 is also an absolute flow with a circumferential velocity component "W2y+U," i.e., a relative flow with the circumferential velocity component W2y. Then, in a conventional technique mentioned below not having a first protruding portion, a second protruding portion, a circulating-flow generating chamber, and a plurality of guide plates, a leaked steam to flow out from the gap flow path 13 to the downstream side of the rotor blades 5 in the main flow path 7 is also an absolute flow with a circumferential velocity component "W2y+U," i.e., a relative flow with the circumferential velocity component W2y. On the other hand, a main flow steam having passed through the rotor blades 5 in the main flow path 7 is an absolute flow with almost no circumferential velocity components, i.e., a relative flow with the circumferential velocity component W3y, as illustrated in FIG. 3. Accordingly, the motive power loss coefficient in an area near a blade tip increases as illustrated by the dotted line in FIG. 6, and the mixing loss increases. In addition, since a leaked steam in the gap flow path 13 has a large circumferential velocity component "W2y+U," unstable vibration of the rotor 4 caused thereby occurs more easily.

In view of this, as a feature of the present embodiment, annular protruding portions 16 and 17 that protrude toward the upstream side of the rotor's axis direction are formed on the upstream-side side surface of the shroud 6. The first protruding portion 16 is positioned at an inner edge portion in the rotor's radius direction on the upstream-side side surface of the shroud 6, and is formed such that a step is not created between the inner circumferential surface of the first protruding portion 16 and the inner circumferential surface 10 of the shroud 6 mentioned above. The second protruding portion 17 is positioned at an outer edge portion in the rotor's radius direction on the upstream-side side surface of the shroud 6, and is longer than the first protruding portion 16. Then, it is configured such that the outer circumferential surface of the first protruding portion 16, the inner circumferential surface of the second protruding portion 17, and the upstream-side side surface of the shroud 6 form a circulating-flow generating chamber, or a secondary flow generating chamber, 18 to generate a circulating flow, or a secondary flow, A1. Explaining specifically, the circulating-flow generating chamber is configured to generate the circulating flow A1 such that part of leaked steam having flowed into the gap flow path 13 is allowed to collide with the tip surface of the first protruding portion 16 to be directed to the outer side in the rotor's radius direction, and thereafter collide with the inner circumferential surface of the second protruding portion 17 to be directed to the inner side in the rotor's radius direction. In other words, the circulating-flow generating chamber is configured to generate the circulating flow A1 that detours to the downstream side in the rotor's axis direction and the inner side in the rotor's radius direction.

Note that although the second protruding portion 17 is longer than the first protruding portion 16 in the present embodiment, they may have the same lengths. In addition, although the tip surface of the first protruding portion 16 extends in the rotor's radius direction without being inclined, it may be inclined toward the downstream side in the rotor's axis direction relative to the outward direction in the rotor's radius direction. In addition, although the inner circumferential surface of the second protruding portion 17 is inclined toward the inner side in the rotor's radius direction relative to the downstream direction in the rotor's axis direction in the present embodiment, it may extend in the rotor's axis direction without being inclined.

As a feature of the present embodiment, a plurality of guide plates 19 positioned in the circulating-flow generating chamber 18 are formed on the upstream-side side surface of the shroud 6. The plurality of guide plates 19 are arrayed at predetermined intervals in the circumference direction, and are inclined opposite the rotor's rotation direction relative to the inward direction in the rotor's radius direction. Note that the angle θ of inclination of the guide plates 19 relative to the rotor's radius direction is larger than the angle of inclination of a relative velocity vector W2' mentioned below relative to the rotor's radius direction. Although the angle θ of inclination of the guide plates 19 is about 30° in the present embodiment, it is modified according to specification conditions.

The leaked steam having flowed into the gap flow path 13 from the downstream side of the stator blades 2 in the main flow path 7 has the relative velocity vector W2' represented by the circumferential velocity component W2y and a radial component W2z as illustrated in FIG. 4. Accordingly, part of the leaked steam flowing into the circulating-flow generating chamber 18 also has the relative velocity vector W2'. However, since the leaked steam in the circulating-flow generating chamber 18 flows along the guide plates 19 as it flows to the inner side from the outer side in the rotor's radius direction, it becomes a circulating flow A1', or a relative flow, with a circumferential velocity component, n.b., a velocity component opposite to the rotor's rotation direction, as illustrated in FIG. 4. Then, due to interference by the thus-generated circulating flow A1', it is possible to effectively give a circumferential velocity component, n.b., a velocity component opposite to the rotor's rotation direction, to a relative flow B1' of the leaked steam. Specifically, as illustrated in FIG. 4, a relative velocity vector W4 represented by a circumferential velocity component W4y, n.b., a velocity component opposite to the rotor's rotation direction; W4y≈|U|, and a radial component W4z is produced.

In other words, due to interference by the circulating flow A1, or an absolute flow, with a circumferential velocity component, n.b., a velocity component opposite to the rotor's rotation direction, it is possible to effectively eliminate a circumferential velocity component from the absolute flow B1 of the leaked steam, see FIG. 5. Thereby, an absolute flow B2 of leaked steam flowing out from the gap flow path 13 to the downstream side of the rotor blades 5 in the main flow path 7, see FIG. 5, also has almost no circumferential velocity components. Accordingly, it is possible to lower the motive power loss coefficient in an area near the tip of a blade as illustrated by the solid line in FIG. 6, and the mixing loss can be reduced. In addition, unstable vibration of the rotor 4 can be suppressed. Furthermore, the leaked-steam energy can be collected as motive power by the plurality of guide plates 19.

Accordingly, in the present embodiment, it is possible to enhance the mixing loss reduction effect and unstable vibration suppression effect, and to attempt to collect motive power.

Note that although, in the example explained in the first embodiment, the guide plates 19 are planar plates as illustrated in FIG. 4, this is not the sole example, and the guide plates 19 can be modified within a scope not deviating from the gist of the present invention. The guide plates may be curved plates, for example, and gradually inclined opposite the rotor's rotation direction relative to the inward direction in the rotor's radius direction. In this case also, effects similar to those explained above can be attained.

In addition, although, in the example explained in the first embodiment, the circumferential intervals of the guide plates 19, as measured in angles, are ⅛ of the circumferential intervals of the rotor blades 5, as measured in angles, as illustrated in FIG. 4, this is not the sole example, and the circumferential intervals of the guide plates 19 can be modified within a scope not deviating from the gist of the present invention. The circumferential intervals of the guide plates 19 may be modified according to the flow rate of the leaked steam. In addition, if the distribution of the flow rate of the leaked steam is not uniform, the circumferential intervals of the guide plates 19 may be made not uniform correspondingly.

In addition, although, in the example explained in the first embodiment, the labyrinth seal has the four stages of seal fins 14A to 14D and one step portion 15, this is not the sole example, and the labyrinth seal may be modified within a scope not deviating from the gist of the present invention. That is, the number of stages of seal fins is not limited to four, but may be two, three, or equal to or greater than five. In addition, the labyrinth seal may not have step portions, and may have two or more step portions. In these cases also, effects similar to those explained above can be attained.

A second embodiment of the present invention is explained with reference to FIG. 7 and FIG. 8. Note that portions in the present embodiment that are equivalent to those in the first embodiment are given the same signs, and explanations thereof are omitted as appropriate.

Figure 7:
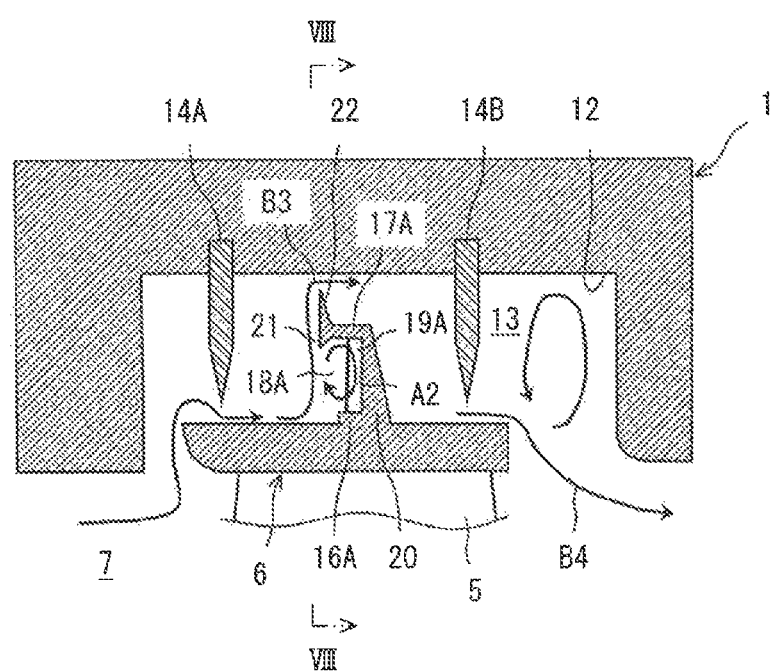
FIG. 7 is a partial enlarged cross-sectional view representing a detailed structure of a gap flow path in a second embodiment of the present invention.

FIG. 7 is a partial enlarged cross-sectional view representing the detailed structure of a gap flow path in the second embodiment of the present invention. FIG. 8 is a cross-sectional view taken along the cross-section VIII-VIII in FIG. 7 in the rotor's radius direction, and illustrates a relative flow in the gap flow path. Note that an illustration of the casing side is omitted in FIG. 8 for convenience.

In the present embodiment, the inner circumferential surface of the groove portion 12 is provided with annular seal fins 14A and 14B. On the outer circumferential surface of the shroud 6, an annular third protruding portion 20 that protrudes toward the outer side in the rotor's radius direction is formed so as to be positioned between the seal fins 14A and 14B. Annular protruding portions 16A and 17A that protrude toward the upstream side of the rotor's axis direction are formed on the upstream-side side surface of the third protruding portion 20. An annular fourth protruding portion 21 that protrudes toward the inner side in the rotor's radius direction is formed at a tip portion of the second protruding portion 17A. The downstream-side side surface of the fourth protruding portion 21 is inclined toward the downstream side in the rotor's axis direction relative to the outward direction in the rotor's radius direction. An annular seal fin 22, or a rotating-body-side seal fin, that extends toward the outer side in the rotor's radius direction is provided on the outer-circumference side of the second protruding portion 17A.

The first protruding portion 16A is positioned at an inner edge portion in the rotor's radius direction on the upstream-side side surface of the third protruding portion 20, and is located at the same position as the gap between the tip of the seal fin 14A, or a casing-side seal fin, and the outer circumferential surface of the shroud 6 in the rotor's radius direction. The second protruding portion 17A is positioned at an outer edge portion in the rotor's radius direction on the upstream-side side surface of the third protruding portion 20 and is longer than the first protruding portion 16A. Then, the outer circumferential surface of the first protruding portion 16A, the inner circumferential surface of the second protruding portion 17A, and the upstream-side side surface of the third protruding portion 20 form a circulating-flow generating chamber 18A to generate a circulating flow A2. Explaining specifically, the circulating flow A2 is generated such that part of the leaked steam having passed through the gap between the tip of the seal fin 14A and the outer circumferential surface of the shroud 6 is allowed to collide with the tip surface of the first protruding portion 16A to be directed to the outer side in the rotor's radius direction, and thereafter collide with the downstream-side side surface of the fourth protruding portion 21 and the inner circumferential surface of the second protruding portion 17A to be directed to the inner side in the rotor's radius direction. In other words, the circulating flow A2 that detours to the downstream side in the rotor's axis direction and to the inner side in the rotor's radius direction is generated.

Note that although the second protruding portion 17A is longer than the first protruding portion 16A in the present embodiment, they may have the same lengths. In addition, although the tip surface of the first protruding portion 16A extends in the rotor's radius direction without being inclined, it may be inclined toward the downstream side in the rotor's axis direction relative to the outward direction in the rotor's radius direction. In addition, although the fourth protruding portion 21 is formed at a tip portion of the second protruding portion 17A in the present embodiment, the fourth protruding portion 21 may not be formed.

As a feature of the present embodiment, a plurality of guide plates 19A positioned in the circulating-flow generating chamber 18A are formed on the upstream-side side surface of the third protruding portion 20. The plurality of guide plates 19A are arrayed at predetermined intervals in the circumference direction, and are inclined opposite the rotor's rotation direction relative to the inward direction in the rotor's radius direction. Note that the angle θ of inclination of the guide plates 19A relative to the rotor's radius direction is larger than the angle of inclination of the relative velocity vector W2' relative to the rotor's radius direction.

Figure 8:
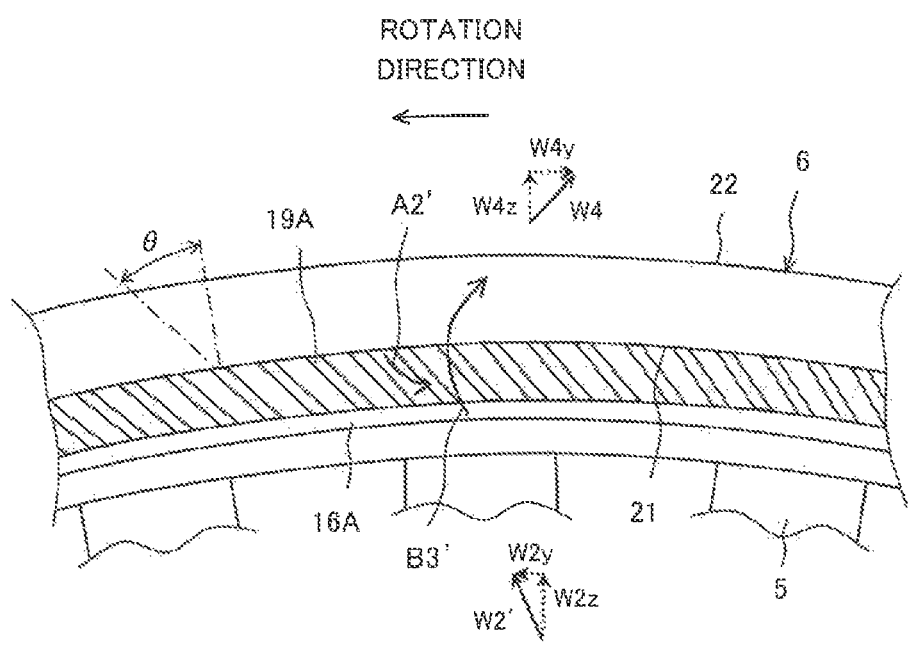
FIG. 8 is a cross-sectional view taken along a cross-section VIII-VIII in FIG. 7 in the rotor's radius direction, and illustrates a relative flow in the gap flow path.

The leaked steam having passed through the gap between the tip of the seal fin 14A and the outer circumferential surface of the shroud 6 has the relative velocity vector W2' represented by the circumferential velocity component W2$y$ and the radial component W2$z$ as illustrated in FIG. 8. Accordingly, part of the leaked steam flowing into the circulating-flow generating chamber 18A also has the relative velocity vector W2'. However, since the leaked steam in the circulating-flow generating chamber 18A flows along the guide plates 19A as it flows to the inner side from the outer side in the rotor's radius direction, it becomes a circulating flow A2', or a relative flow, with a circumferential velocity component, n.b., a velocity component opposite to the rotor's rotation direction, as illustrated in FIG. 8. Then, due to interference by the thus-generated circulating flow A2', it is possible to effectively give a circumferential velocity component, n.b., a velocity component opposite to the rotor's rotation direction, to a relative flow B3' of the leaked steam. Specifically, as illustrated in FIG. 8, a relative velocity vector W4 represented by a circumferential velocity component W4$y$, n.b., a velocity component opposite to the rotor's rotation direction; W4$y$≈|U|, and a radial component W4$z$ is produced.

In other words, due to interference by the circulating flow A2, or the absolute flow, with a circumferential velocity component, n.b., a velocity component opposite to the rotor's rotation direction, it is possible to effectively eliminate a circumferential velocity component from the absolute flow B3 of the leaked steam. Thereby, an absolute flow B4 of leaked steam flowing out from the gap flow path 13 to the downstream side of the rotor blades 5 in the main flow path 7 also has almost no circumferential velocity components. Accordingly, mixing loss can be reduced. In addition, unstable vibration of the rotor 4 can be suppressed. In addition, the leaked-steam energy can be collected as motive power by the plurality of guide plates 19A.

Accordingly, similar to the first embodiment, in the present embodiment also, it is possible to enhance the mixing loss reduction effect and unstable vibration suppression effect, and to attempt to collect motive power.

Note that although, in the examples explained above, the target to which the present invention is applied is a steam turbine, which is one type of axial flow turbines, these are not the sole examples, and the present invention may be applied to a gas turbine or the like. In this case also, effects similar to those explained above can be attained.

DESCRIPTION OF REFERENCE CHARACTERS

1: Diaphragm outer ring
2: stator blade
4: Rotor
5: rotor blade
6: Shroud
7: Main flow path
12: Groove portion
13: Gap flow path
14A to 14D: Seal fin
16, 16A: First protruding portion
17, 17A: Second protruding portion
18, 18A: Circulating-flow generating chamber
19, 19A: Guide plate
20: Third protruding portion
21: Fourth protruding portion
22: Seal fin

What is claimed is:

1. An axial flow turbine comprising:
a casing;
a rotating body;
a plurality of stator blades that are provided on an inner-circumference side of the casing and arrayed in a circumference direction;
a plurality of rotor blades that are provided on an outer-circumference side of the rotating body and arrayed in the circumference direction;
a main flow path in which the plurality of stator blades are arranged and the plurality of rotor blades are arranged on a downstream side of the plurality of stator blades, and through which a working fluid is distributed;
a shroud provided on an outer-circumference side of the plurality of rotor blades;
an annular groove portion that is formed on the casing and houses the shroud;
a gap flow path into which part of the working fluid flows as a leakage flow from a downstream side of the stator blades in the main flow path, and out of which the leakage flow flows to a downstream side of the rotor blades in the main flow path, the gap flow path being formed between the groove portion and the shroud; and
a plurality of stages of seal fins provided in the gap flow path, the plurality of stages of seal fins including a casing-side seal fin provided to the casing,
wherein the axial flow turbine further comprises:
an annular third protruding protion that is formed on an outer circumferential surface of the shroud so as to be arranged on a downstream side of the casing-side seal fin, and protrudes toward the outer side in the radius direction of the rotating body;
an annular first protruding portion that is formed on an upstream-side side surface of the third protruding portion so as to be located at a same position as a gap between a tip of the casing-side seal fin and the outer circumferential surface of the shroud in the radius direction of the rotating body, and protrudes toward an upstream side in an axis direction of the rotating body;
an annular second protruding portion that is formed on the upstream-side side surface of the third protruding portion so as to be positioned on an outer side in a radius direction of the rotating body relative to the first protruding portion, protrudes toward the upstream side in the axis direction of the rotating body, and has a length longer than or equal to the first protruding portion;
a circulating-flow generating chamber formed between the first protruding portion and the second protruding portion; and
a plurality of guide plates formed on the shroud so as to be positioned in the circulating-flow generating chamber, wherein
the circulating-flow generating chamber is configured to generate a circulating flow such that part of the leakage flow is allowed to collide with a tip surface of the first protruding portion to be directed to the outer side in the radius direction of the rotating body and thereafter collide with an inner circumferential surface of the second protruding portion to be directed to an inner side in the radius direction of the rotating body, and
the plurality of guide plates are inclined opposite a rotation direction of the rotating body relative to an inward direction in the radius direction of the rotating body.

2. An axial flow turbine comprising:
a casing;
a rotating body;
a plurality of stator blades that are provided on an inner-circumference side of the casing and arrayed in a circumference direction;
a plurality of rotor blades that are provided on an outer-circumference side of the rotating body and arrayed in the circumference direction;
a main flow path in which the plurality of stator blades are arranged and the plurality of rotor blades are arranged on a downstream side of the plurality of stator blades, and through which a working fluid is distributed;
a shroud provided on an outer-circumference side of the plurality of rotor blades;
an annular groove portion that is formed on the casing and houses the shroud;
a gap flow path into which part of the working fluid flows as a leakage flow from a downstream side of the stator blades in the main flow path, and out of which the leakage flow flows to a downstream side of the rotor blades in the main flow path, the gap flow path being formed between the groove portion and the shroud; and
a plurality of stages of seal fins provided in the gap flow path;
wherein the axial flow turbine further comprises:

an annular third protruding portion that is formed on an outer circumferential surface of the shroud and protrudes toward the outer side in the radius direction of the rotating body;

an annular first protruding portion that is formed on an upstream-side side surface of the third protruding portion and protrudes toward an upstream side in an axis direction of the rotating body;

an annular second protruding portion that is formed on the upstream-side side surface of the third protruding portion so as to be positioned on an outer side in a radius direction of the rotating body relative to the first protruding portion, protrudes toward the upstream side in the axis direction of the rotating body, and has a length longer than or equal to the first protruding portion;

an annular fourth protruding portion that is formed at a tip portion of the second protruding portion, and protrudes toward the inner side in the radius direction of the rotating body, a circulating-flow generating chamber formed between the first protruding portion and the second protruding portion; and a plurality of guide plates formed on the shroud so as to be portioned in the circulating-flow generating chamber;

wherein the circulating-flow generating chamber is configured to generate a circulating flow such that part of the leakage flow is allowed to collide with a tip surface of the first protruding portion to be directed to the outer side in the radius direction of the rotating body and thereafter collide with an inner circumferential surface of the second protruding portion to be directed to an inner side in the radius direction of the rotating body; and the plurality of guide plates are inclined opposite a rotation direction of the rotating body relative to an inward direction in the radius direction of the rotating body.

3. The axial flow turbine according to claim 2, wherein the plurality of stages of seal fins include a rotating-body-side seal fin that is provided on an outer-circumference side of the second protruding portion and extends toward the outer side in the radius direction of the rotating body.

* * * * *